(12) United States Patent
Goossens et al.

(10) Patent No.: US 12,515,637 B2
(45) Date of Patent: Jan. 6, 2026

(54) SYSTEMS AND METHODS FOR VEHICLE HILL CONTROL

(71) Applicant: Dana Belgium N.V., Flanders (BE)

(72) Inventors: Stijn Goossens, Erpe-Mere (BE); Bert Hannon, Bruges (BE)

(73) Assignee: DANA BELGIUM N.V., Bruges (BE)

( * ) Notice: Subject to any disclaimer, the term of this patent is extended or adjusted under 35 U.S.C. 154(b) by 632 days.

(21) Appl. No.: 17/457,612

(22) Filed: Dec. 3, 2021

(65) Prior Publication Data

US 2023/0174043 A1 Jun. 8, 2023

(51) Int. Cl.
*B60W 20/15* (2016.01)
*B60W 10/02* (2006.01)
(Continued)

(52) U.S. Cl.
CPC ............ *B60W 20/15* (2016.01); *B60W 10/02* (2013.01); *B60W 10/06* (2013.01); *B60W 10/08* (2013.01); *B60W 10/10* (2013.01); *B60W 10/18* (2013.01); *B60W 30/18054* (2013.01); *F16D 48/06* (2013.01); *B60W 2300/17* (2013.01);
(Continued)

(58) Field of Classification Search
CPC ...... B60W 20/15; B60W 10/02; B60W 10/06; B60W 10/08; B60W 10/10; B60W 10/18; B60W 30/18054; B60W 2300/17; B60W 2510/083; B60W 2520/04; B60W 2552/15; B60W 2710/021; B60W 2710/06; B60W 2710/08; B60W 2710/10; B60W 2710/18; B60W 2050/0088; B60W 2540/12; B60W 2710/083; B60W 30/18027; B60W 30/18063; B60W 30/18118; B60W 30/18009; B60W 20/00; B60W 40/076; F16D 48/06; F16D 2500/10412; F16D 2500/106; F16D 2500/108;
(Continued)

(56) References Cited

U.S. PATENT DOCUMENTS 5,769,752 A * 6/1998 Kim ...................... F16D 48/066
477/901
8,620,498 B2 * 12/2013 Zerbini ................. B60W 10/18
701/65
(Continued)

FOREIGN PATENT DOCUMENTS

DE 102006044895 A1 4/2008
EP 1396369 A2 3/2004

*Primary Examiner* — Dylan M Katz
(74) *Attorney, Agent, or Firm* — McCoy Russell LLP (57) ABSTRACT

Methods and systems are provided for a vehicle hill control. An example of a method may include during a vehicle stopped condition, operating with a clutch of a transmission engaged to mechanically lock the transmission, the transmission having a plurality of power inputs including receiving input from an electric machine and a prime mover; releasing at least one of the clutch or a service brake, and while releasing, concurrently adjusting an output magnitude of the electric machine responsive to speed control to control to a zero vehicle speed. In some examples, the method may further include learning a torque output of the electric machine required to maintain the zero vehicle speed upon fully releasing the clutch or service brake. In an example, the method may include estimating a road grade based on the learned torque output.

17 Claims, 6 Drawing Sheets

(51) Int. Cl.
  *B60W 10/06* (2006.01)
  *B60W 10/08* (2006.01)
  *B60W 10/10* (2012.01)
  *B60W 10/18* (2012.01)
  *B60W 30/18* (2012.01)
  *F16D 48/06* (2006.01)

(52) U.S. Cl.
  CPC ... *B60W 2510/083* (2013.01); *B60W 2520/04* (2013.01); *B60W 2552/15* (2020.02); *B60W 2710/021* (2013.01); *B60W 2710/06* (2013.01); *B60W 2710/08* (2013.01); *B60W 2710/10* (2013.01); *B60W 2710/18* (2013.01); *F16D 2500/10412* (2013.01); *F16D 2500/106* (2013.01); *F16D 2500/108* (2013.01); *F16D 2500/1107* (2013.01); *F16D 2500/3108* (2013.01); *F16D 2500/3124* (2013.01)

(58) Field of Classification Search
  CPC ..... F16D 2500/1107; F16D 2500/3108; F16D 2500/3124
  See application file for complete search history.

(56) References Cited

U.S. PATENT DOCUMENTS

| | | | |
|---|---|---|---|
| 9,393,858 B2 | 7/2016 | Halwes | |
| 2013/0297120 A1* | 11/2013 | Reed | B60W 10/115 903/902 |
| 2017/0001624 A1* | 1/2017 | Wang | B60W 20/13 |
| 2018/0065629 A1* | 3/2018 | Wolff | B60W 30/18009 |
| 2020/0325964 A1 | 10/2020 | Kimes | |
| 2020/0398843 A1* | 12/2020 | Sabbatini | B60W 30/18118 |
| 2021/0018072 A1 | 1/2021 | Steinberger et al. | |

* cited by examiner

SYSTEMS AND METHODS FOR VEHICLE HILL CONTROL

TECHNICAL FIELD

The present description relates generally to methods and systems for vehicle hill hold control.

BACKGROUND AND SUMMARY

Many vehicle systems utilize hill hold functionality. For a vehicle system with an electromechanical infinitely variable transmission (EMIVT), such as described in Steinberger et al. in U.S. Patent Application number 20210018072 hill hold control methods may be complex. Hill hold control strategies may include the use of a friction hold brake, e.g., a parking pawl or service brake, or the use of a clutch configuration. In some examples, slope sensors may be included to estimate vehicle launch torque. In other examples, time sensitive calibrations may be employed to blend brake and throttle pedal demands to generate desired speed set points and ramp rates.

The inventors herein have recognized potential issues with such systems, including, for example, launching from a hill hold smoothly, in the correct direction, and while reducing vehicle rollback, especially in a vehicle system with an EMIVT. In examples where a parking pawl or parking brake may be utilized, repeated use of the pawl in high torque applications may lead to degradation of the pawl, and in some examples, lead to a compromised ability to hill hold. In other examples, hill hold control involving electromagnetic devices (e.g., electromotors) are challenging for long durations, may result in localized overheating of the motor, and with extended use, may cause wear and degradation to the drive system. Wear to the drive system may also result from hill hold strategies involving electromotors by putting additional load on traction electromotors. In other examples, hill holds involving electromotors may result in the dissipation of power. In some examples, slope estimate methods for hill hold and launch, e.g. using sensors, may be costly to install and maintain, and degradation of the sensor of time can exacerbate the above issues related to motor wear, heat generation, and power drain. In other examples, launching from a hill hold may involve active manipulation or overwriting of service brake and/or the blending of service brake and throttle demands which, in some examples, may increase braking system complexity, e.g., safety functionality, and expense.

In one example, the issues described above may be addressed by a method for a vehicle, comprising: during a vehicle stopped condition, operating with a clutch of a transmission engaged to mechanically lock the transmission, the transmission having a plurality of power inputs including receiving input from an electric machine and a prime mover; releasing at least one of the clutch or a service brake, and while releasing, concurrently adjusting an output magnitude of the electric machine responsive to speed control to control to zero vehicle speed. In this way, hill hold functionality may be obtained for a vehicle while reducing overheating or imposing heavy loads on power inputs, and providing an intuitive launch without rollback.

As one example, the method may include learning a torque output of the electric machine required to maintain zero vehicle speed upon fully releasing the clutch or service brake. As a further example of the method, a road grade estimate may be based on the learned torque output required to maintain the electric machine at zero speed. The learned torque output may be added to an operator torque request, and the prime mover and transmission may be adjusted in response thereto. Embodiments of the method may be carried out without sensing road grade from an accelerometer onboard the vehicle. In this way, the slope of a hill and the launch from a stopped condition may be estimated from the electric machine of the drive system without the use of a sensor. As such, by mechanically locking the transmission via a clutch combination, a hill hold may be achieved that minimizes localized overheating and load on the electric machine, and by maintaining speed control of the electric machine, an improved hill launch may be determined from the measure of torque to maintain the vehicle at zero speed on a slope while the holding force is released.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
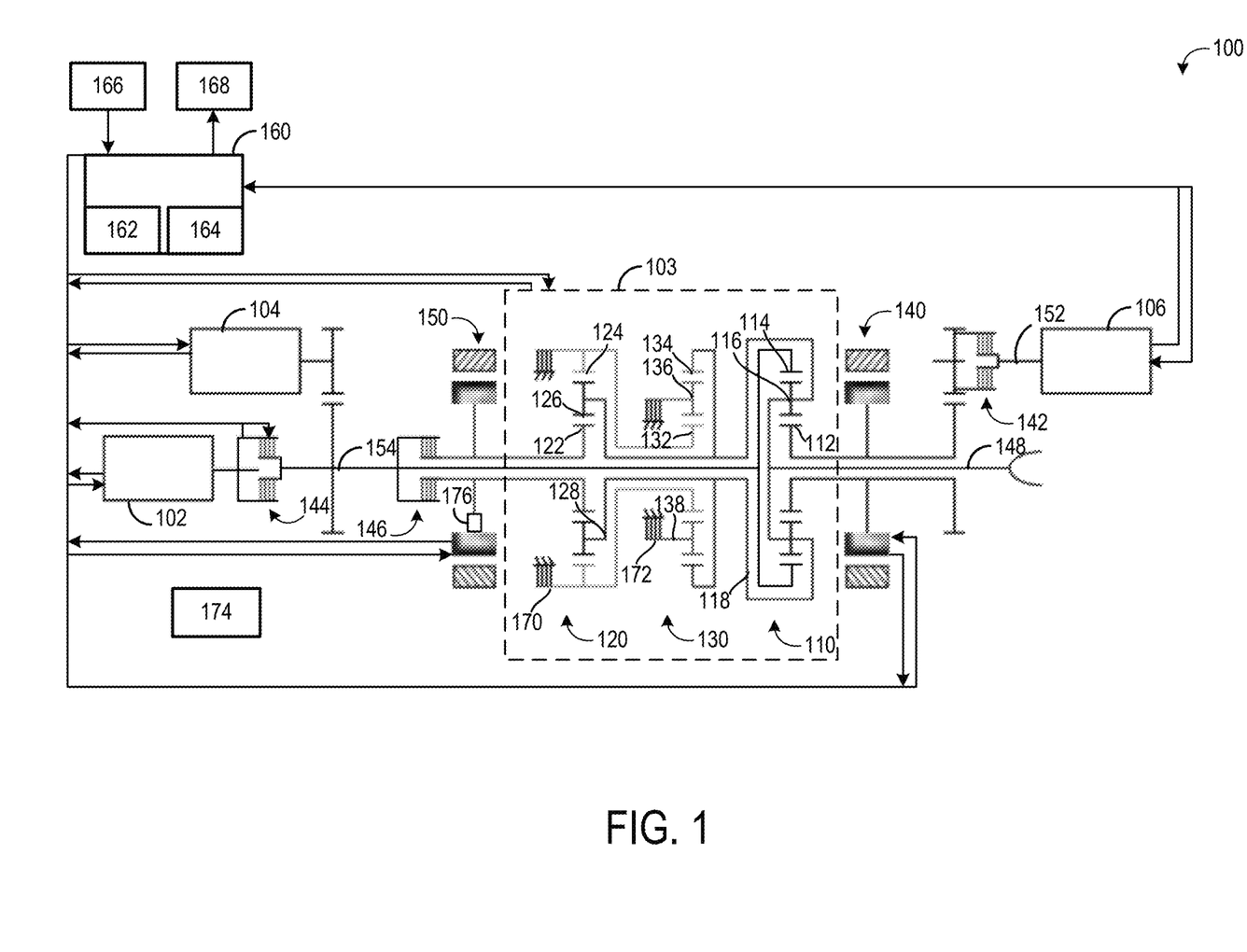
FIG. 1 shows a schematic diagram of a drive system for a vehicle.
Figure 2:
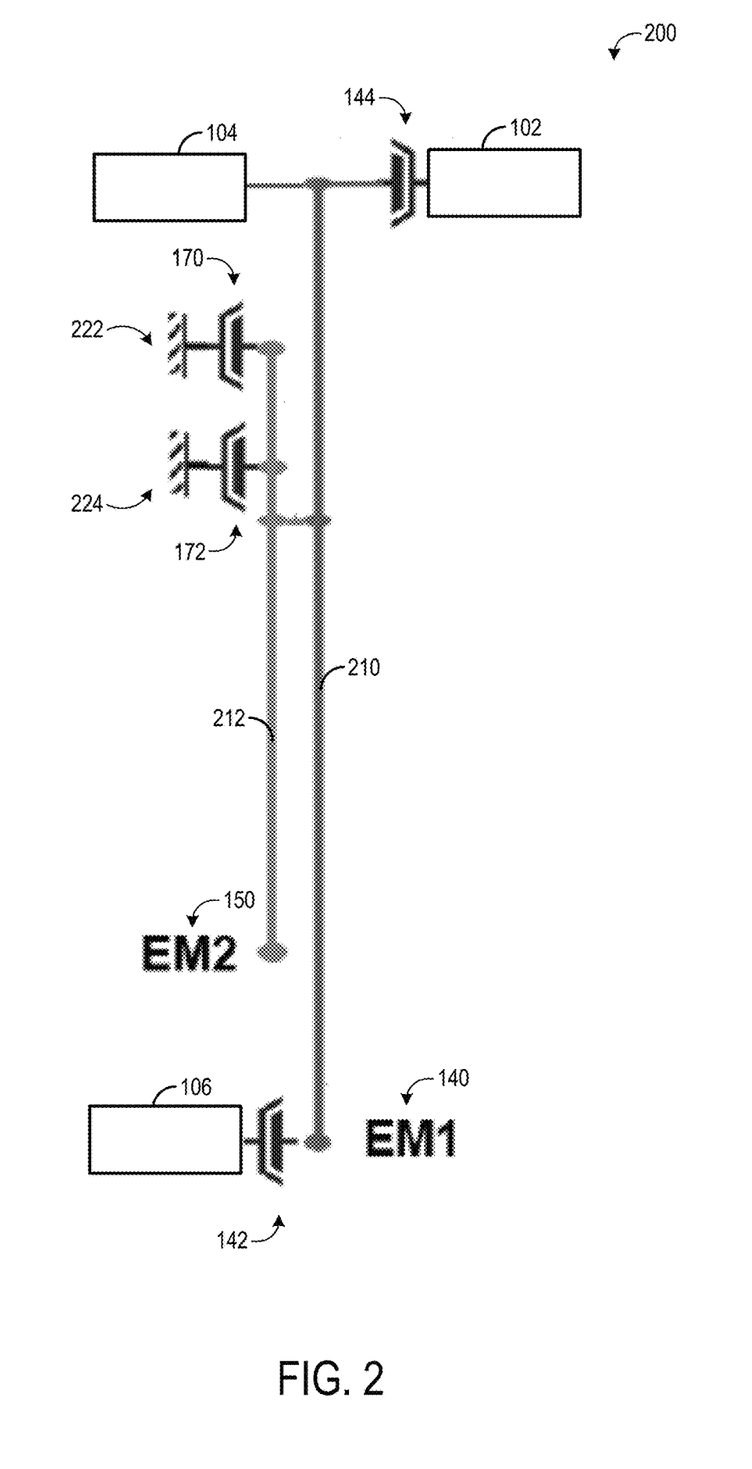
FIG. 2 shows a lever diagram representation of the drive system of FIG. 1.
Figure 3:
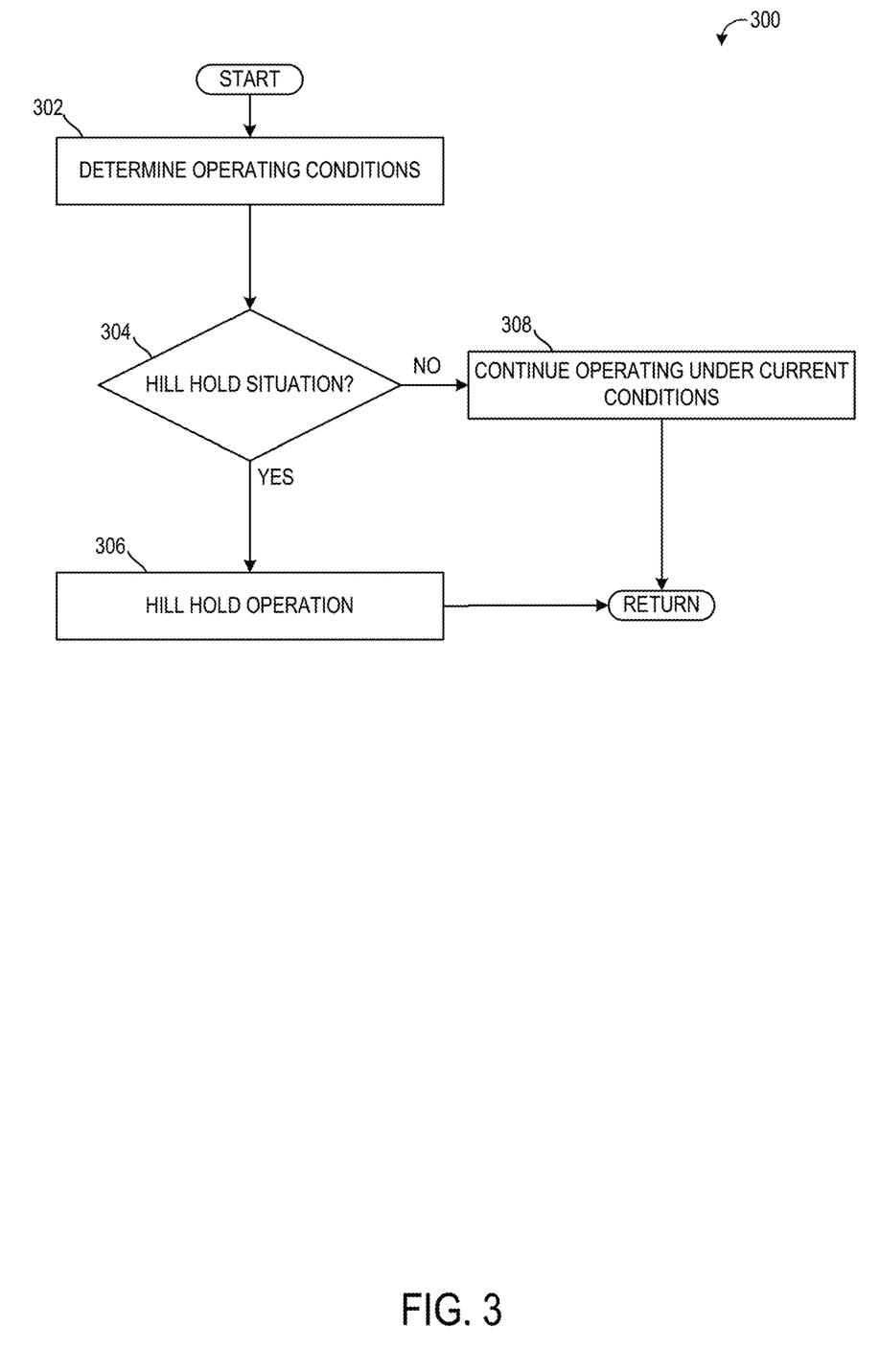
FIG. 3 shows a method for engaging a drive system configuration, such as that of FIGS. 1-2, in a hill condition.
Figure 4:
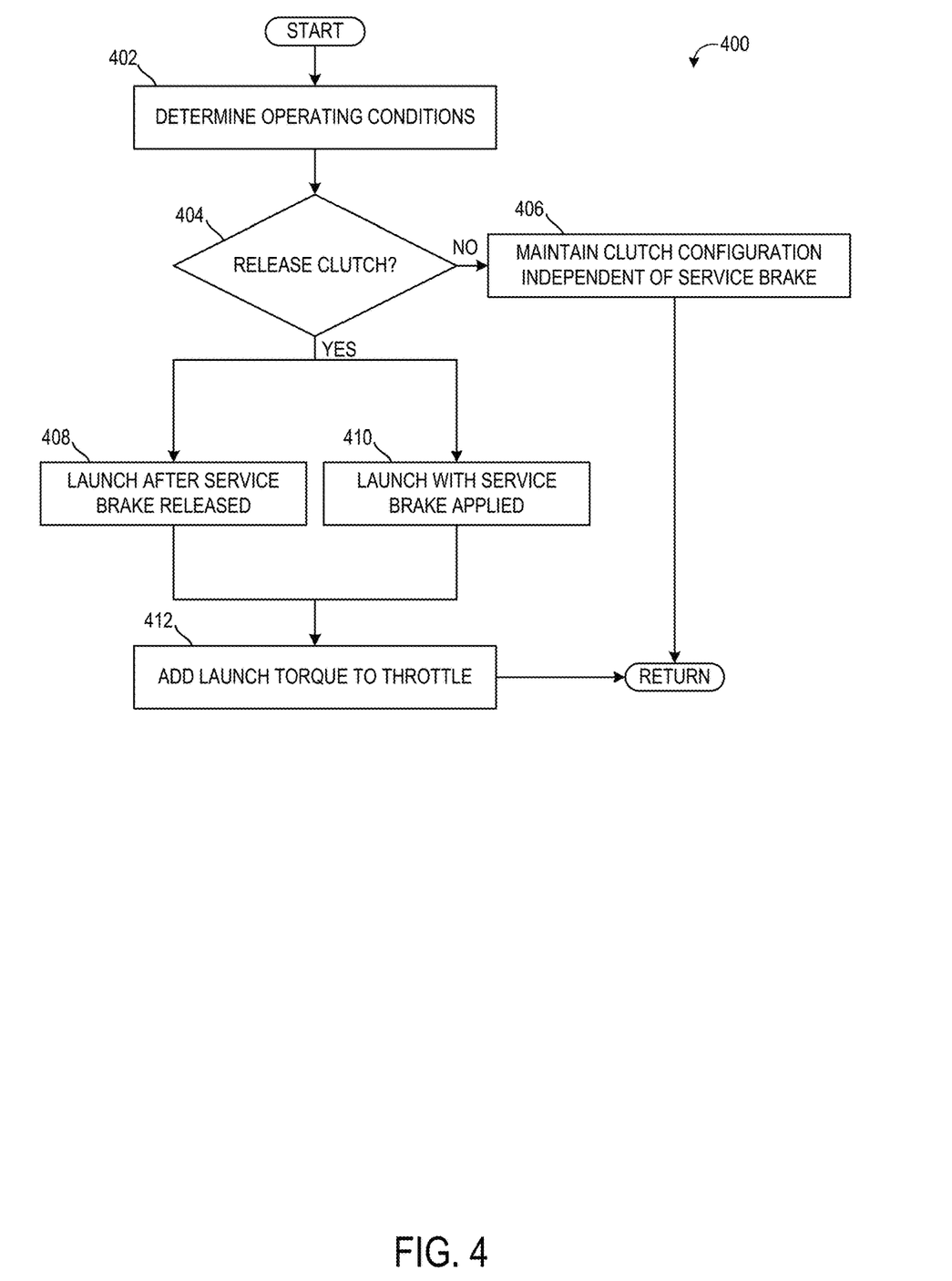
FIG. 4 shows a method for disengaging a drive system configuration, such as that of FIGS. 1-2, in a hill condition.

The following description relates to systems and methods for hill hold functionality for a vehicle with an electromechanical infinitely variable transmission (EMIVT). In an exemplary embodiment, a drive system of a vehicle may be arranged with two electromotors, an engine, and a transmission including a plurality of planetaries, as shown in FIG. 1. FIG. 2 shows a lever diagram representation of the drive system of FIG. 1. An engine controller may be configured to perform control routines, such as the example methods 300 and 400 of FIGS. 3 and 4, to adjust operating conditions, including an electromotor and a clutch configuration, during a stopped vehicle condition. Therein, during the stopped vehicle condition, the mid and lower clutches may engage to mechanically lock the output shaft of the EMIVT and the second electromotor may control the output speed, as depicted in FIG. 3. When hill launch is desired, the mechanically locked clutch configuration may be disengaged and a hill launch torque calculated from the superposition of the electromotor torque and throttle demand. Two examples of operation according to the methods of FIGS. 3 and 4 are illustrated in the example timelines of FIGS. 5 and 6.

FIG. 1 shows an embodiment of a drive system for a vehicle, shown as drive system 100. In an exemplary embodiment of the method, the drive system may be implemented in an off-highway work machine. The various components of drive system 100 may be controlled by electronic drive system controller 160, which may be included in a vehicle control system. The drive system 100 may also include a transmission 103 having a clutch and having a plurality of power inputs. The drive system may include a service brake 174, shown schematically. In one example, the service brake 174 may be applied to the vehicle's wheels (not shown). In one example, the service brake may be hydraulically powered and may be actuated by the operator via a pedal (not shown). In another example, the service brake 174 may be automatically applied. A first power input of the drive system may include a prime mover, such as engine 102 of FIG. 1. In some embodiments, engine 102 may be an internal combustion engine. The drive system may include at least a second power input from an electric machine. In another example, the transmission 103 may include at least two power inputs from the electric machine and another electric machine. The exemplary embodiment of FIG. 1 is depicted with a first electric machine, e.g., a first electromotor 140, and a second electric machine, e.g., a second electromotor 150. The transmission 103 may include the first electromotor 140 and the second electromotor 150.

In some examples, one or more of the first electromotor 140 and the second electromotor 150 may be configured as a motor/generator. The engine 102 may provide mechanical energy input to one or more of the electromotors such that the one or more of the electromotors operates as a generator. Electrical energy generated by the one or more of the electromotors may be used to power other vehicle systems, the other of the electromotors, etc., or may be stored at an energy storage device, such as a battery.

As shown in FIG. 1, the transmission 103 includes a first power transmission device or gear set, shown as power split planetary 110, a second power transmission device or gear set, shown as output planetary 120 (mid-range), and a third power transmission device or gear set, shown as output coupling planetary (low range) 130. Also in FIG. 1, one or more of the power split planetary 110, the output planetary 120, and the output coupling planetary 130 are disposed between (e.g., sandwiched by) the first electromotor 140 and the second electromotor 150. In another embodiment, the power split planetary 110, output planetary 120, and the output coupling planetary 130 may be positioned outside of (e.g., on either side of, sandwiching, not between) the first electromotor 140 and the second electromotor 150.

Continuing with the exemplary embodiment shown in FIG. 1, the power split planetary 110 is a planetary gear set that includes a sun gear 112, a ring gear 114, and a plurality of planetary gears 116. The plurality of planetary gears 116 couple the sun gear 112 to the ring gear 114, according to an exemplary embodiment. As shown in FIG. 1, a carrier 118 rotationally supports the plurality of planetary gears 116. In one embodiment, the first electromotor 140 is directly coupled to the sun gear such that the power split planetary is coupled to the first electromotor. By way of example, the first electromotor 140 may include or be coupled to a shaft (e.g., a first shaft, an input shaft, an output shaft) directly coupled to the sun gear 112.

The output planetary 120 is a planetary gear set that includes a sun gear 122, a ring gear 124, and a plurality of planetary gears 126. The plurality of planetary gears 126 couple the sun gear 122 to the ring gear 124, according to an exemplary embodiment. As shown in FIG. 1, a carrier 128 rotationally supports the plurality of planetary gears 126. In one embodiment, the second electromotor 150 is directly coupled to the sun gear 122 such that the output planetary 120 is coupled to the second electromotor 150. By way of example, the second electromotor 150 may include or be coupled to a shaft (e.g., a second shaft, an input shaft, an output shaft) directly coupled to the sun gear 122. The carrier 118 is directly coupled to the carrier 128, thereby coupling the power split planetary 110 to the output planetary 120, according to the exemplary embodiment of FIG. 1. In one embodiment, directly coupling the carrier 118 to the carrier 128 synchronizes the rotational speeds of the carrier 118 and the carrier 128.

The output coupling planetary 130 is a planetary gear set that includes a sun gear 132, a ring gear 134, and a plurality of planetary gears 136. The plurality of planetary gears 136 couple the sun gear 132 to the ring gear 134, according to an exemplary embodiment. As shown in FIG. 1, a carrier 138 rotationally supports the plurality of planetary gears 136. In one embodiment, the sun gear 132 is directly rotationally coupled to (e.g., fixed directly to) the ring gear 124 such that the output coupling planetary 130 is directly coupled to the output planetary 120. The ring gear 134 is directly coupled to the output planetary 120. The ring gear 134 is directly rotationally coupled to the carrier 118 and the carrier 128 thereby coupling the power split planetary 110 and the output planetary 120 to the output coupling planetary 130, according to an exemplary embodiment shown in FIG. 1. Accordingly, the ring gear 124 of the output planetary 120 is coupled to the carrier 118 and the carrier 128 through the output coupling planetary 130. In some embodiments, the carrier 118 and/or the carrier 128 extend through the output coupling planetary 130. In some embodiments, the output coupling planetary 130 is positioned between the output planetary 120 and the power split planetary 110.

The carrier 118 is directly rotationally coupled to an output with a first shaft, shown as output shaft 148, according to the exemplary embodiment shown in FIG. 1. A second shaft, shown as secondary output shaft 152, is selectively coupled to the output shaft 148 by a clutch, shown as secondary output clutch 142, according to the exemplary embodiment shown in FIG. 1. The secondary output shaft 152 may be coupled to at least one rear axle driveshaft and front axle driveshaft (not shown). By way of example, the secondary output shaft 152 may be coupled to a transfer case (not shown) and/or the rear axle driveshaft where the transmission 103 is installed in place of a traditional, mechanical, straight—thru transmission. In an exemplary embodiment, the output is a power take-off (PTO) output, herein referred to as PTO2 106, and the secondary output shaft 152 is coupled thereto. A clutch assembly may be engaged and disengaged to selectively couple at least one of the front axle driveshaft, a transfer case, and the rear axle driveshaft to the secondary output shaft 152 (e.g., to facilitate operation of a vehicle in a rear-wheel-drive mode, an all-wheel-drive mode, a four-wheel-drive mode, a front-wheel-drive mode, etc.). In other embodiments, the secondary output shaft 152 and the secondary output clutch 142 are omitted, and the output shaft 148 is directly coupled to the output.

As shown in FIG. 1, the transmission 103 includes a shaft, shown as connecting shaft 154. A clutch, shown as neutral clutch 144, is positioned to selectively couple the engine 102 to the connecting shaft 154. The neutral clutch 144 may be a component of the engine 102 or the transmission 103 or a separate component. According to an exemplary embodiment, the neutral clutch 144 and connecting shaft 154 directly couple the engine 102 to the power split planetary 110. In one embodiment, the neutral clutch 144 and connecting shaft 154 directly couple the engine 102 with the ring gear 114 of the power split planetary 110. According to an alternative embodiment, the neutral clutch 144 is omitted, and connecting shaft 154 is directly coupled to the engine 102.

As shown in FIG. 1, the transmission 103 includes a first clutch, shown as input coupled clutch 146. The input coupled clutch 146 is positioned to selectively couple the second electromotor 150 with the engine 102 and the connecting shaft 154, according to an exemplary embodiment. The input coupled clutch 146 may thereby selectively couple the engine 102 to the output planetary 120. As shown in FIG. 1, the connecting shaft 154 extends from the neutral clutch 144, through the input coupled clutch 146 and the second electromotor 150, and through the output planetary 120 and the output coupling planetary 130 to the power split planetary 110. The input coupled clutch 146 may selectively couple the second electromotor 150 with connecting shaft 154. Accordingly, the input coupled clutch 146 may selectively couple the connecting shaft 154 to the sun gear 122 of the output planetary 120. According to an exemplary embodiment, the first electromotor 140 and the second electromotor 150 (e.g., input/output shafts thereof, etc.) are aligned (e.g., radially aligned, etc.) with the power split planetary 110, the output planetary 120, the output coupling planetary 130, the connecting shaft 154, the output shaft 148, and/or the secondary output shaft 152 (e.g., centerlines thereof are aligned, to thereby form a straight-thru or inline transmission arrangement, etc.). In an exemplary embodiment, the input coupled clutch 146 may selectively couple to a first power take-off (PTO1) output 104 via a gear set 155, and the connecting shaft 154 is coupled thereto.

According to the exemplary embodiment shown in FIG. 1, the transmission 103 further includes a second clutch or brake, shown as a low clutch 172. The low clutch 172 is positioned to selectively inhibit movement of the carrier 138 (e.g., by coupling the carrier 138 to a housing of the transmission 103), according to an exemplary embodiment. When the movement of the carrier 138 is limited (e.g., prevented), the sun gear 132 is coupled to the ring gear 134 through the plurality of planetary gears 136 such that a rotation of the sun gear 132 causes a corresponding rotation of the ring gear 134. Accordingly, the low clutch 172 may thereby selectively couple the ring gear 124 to the carrier 118 and the carrier 128.

The transmission 103 may further include a third clutch or neutral disconnect clutch, shown in FIG. 1 as secondary output clutch 142. The secondary output clutch 142 is positioned to selectively couple the output shaft 148 with the secondary output shaft 152, according to an exemplary embodiment. The secondary output clutch 142 may thereby selectively couple the carrier 118 and the carrier 128 to the secondary output shaft 152. As shown in FIG. 1, the output shaft 148 extends from the power split planetary 110, through the first electromotor 140, and out to the secondary output clutch 142. In other embodiments, the secondary output clutch 142 is omitted.

In some embodiments, the neutral clutch 144 is biased into an engaged position (e.g., with a spring, etc.) and selectively disengaged (e.g., with application of pressurized hydraulic fluid, etc.). In some embodiments, the input coupled clutch 146 is biased into a disengaged position (e.g., with a spring, etc.) and selectively engaged (e.g., with application of pressurized hydraulic fluid, etc.). In some embodiments, the low clutch 172 is biased into a disengaged position (e.g., with a spring, etc.) and selectively engaged (e.g., with application of pressurized hydraulic fluid, etc.). In some embodiments, the secondary output clutch 142 is biased into an engaged position (e.g., with a spring, etc.) and selectively disengaged (e.g., with application of pressurized hydraulic fluid, etc.). In other embodiments, one or more of the neutral clutch 144, the input coupled clutch 146, the low clutch 172, and the secondary output clutch 142 are hydraulically biased and spring released.

Referring again to the exemplary embodiment shown in FIG. 1, the transmission 103 includes a brake or clutch, shown as the mid clutch 170. The mid clutch 170 is positioned to selectively inhibit the movement of at least a portion of the output planetary 120 (e.g., the ring gear 124, etc.), according to an exemplary embodiment. In one embodiment, the mid clutch 170 is biased into a disengaged position (e.g., with a spring, etc.) and selectively engaged (e.g., with application of pressurized hydraulic fluid, etc.). In other embodiments, the mid clutch 170 is hydraulically biased and spring released. In still other embodiments, the components of the transmission 103 are still otherwise engaged and disengaged (e.g., pneumatically, etc.). By way of example, the mid clutch 170 and the low clutch 172 may be engaged simultaneously, providing a driveline brake such that rotational movement of at least one of the output coupling planetary 130 (e.g., the sun gear 132, the ring gear 134, the plurality of planetary gears 136, and the carrier 138, etc.), the output planetary 120 (e.g., the ring gear 124, etc.), the power split planetary 110 (e.g., the carrier 118, etc.), and the output shaft 148 are selectively limited.

According to the exemplary embodiment shown in FIG. 1, the drive system 100 includes a controller 160. In one embodiment, the controller 160 is configured to selectively engage, selectively disengage, or otherwise communicate with components of the drive system 100 according to various modes of operation. As shown in FIG. 1, the controller 160 is coupled to the engine 102. In one embodiment, the controller 160 is configured to selectively engage the engine 102 (e.g., interface with a throttle thereof, etc.) such that an output of the engine 102 rotates at a target rate. The controller 160 is coupled to the first electromotor 140 and the second electromotor 150, according to an exemplary embodiment, and may send and receive signals therewith. By way of example, the controller 160 may send command signals relating to at least one of a target mode of operation, a target rotational speed, and a target rotation direction for the first electromotor 140 and the second electromotor 150. The first electromotor 140 and the second electromotor 150 may be electrically coupled (e.g., by an electrical power transmission system, etc.). By way of example, power generated by the first electromotor 140 may be utilized by the second electromotor 150 (e.g., to provide an output torque as a motor, etc.), or power generated by the second electromotor 150 may be utilized by the first electromotor 140 (e.g., to provide an output torque as a motor, etc.). The controller 160 is configured to selectively engage and selectively disengage the neutral clutch 144, the secondary output clutch 142, the input coupled clutch 146, the low clutch 172, and the mid clutch 170 directly or by interacting with another component (e.g., a pump, a valve, a solenoid, a motor, etc.).

The controller 160 may receive information from a plurality of sensors 166 and may send control signals to a plurality of actuators 168. The plurality of sensors 166 may include, for example, pedal position sensor for monitoring a position of the service brakes, speed sensors coupled to the input shaft and/or output shaft, various engine sensors such as a Hall sensor for determining engine speed, mass flow sensors for measuring air flow, etc. In one embodiment, a speed sensor 176 may be coupled to the second electromotor

150. The speed sensor 176 may estimate speed via an encoder coupled to the output shaft 148. In one example, a proportional-integral controller of the controller 160 may be in communication with the speed sensor 176. The plurality of actuators 168 may include, for example, the various clutches of transmission 103, as described above, as well as various other types of actuators such as valves, pumps, injectors, etc. The controller, while overseeing control and management of the drive system, may be configured to receive signals from the plurality of sensors 166, as further elaborated herein, in order to determine operating parameters and operating conditions, and correspondingly adjust various the plurality of actuators 168 to control operation of the drive system. In one example, the controller 160 may operate one or more control modes (e.g. speed control, torque control) of the second electromotor 150 based on signals received from the speed sensor 176.

According to the exemplary embodiment shown in FIG. 1, the controller 160 includes a processor 162 and a memory 164. In some embodiments, the processor 162 is configured to execute computer code stored in the memory 164 to facilitate the activities described herein, such as described herein with regard to the operations of FIGS. 3-4 to and the operation illustrated in FIGS. 5-6. The memory 164 includes various actuation profiles corresponding to modes of operation (e.g., for the transmission 103, for drive system 100, for a vehicle, etc.), according to an exemplary embodiment.

The hardware and data processing components used to implement the various processes, operations, illustrative logics, logical blocks, modules and circuits described in connection with the embodiments disclosed herein may be implemented or performed with a general purpose single or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory 164 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory 164 may be or include volatile memory or non-volatile memory, and may include database components, object code components, script components, or any other type of information structure for supporting the various activities and information structures described in the present disclosure. According to an exemplary embodiment, the memory 164 is communicably connected to the processor 162 via a processing circuit and includes computer code for executing (e.g., by the processing circuit or the processor 162) the one or more processes described herein.

FIG. 2 is a lever representation of the drive system 100 of FIG. 1, depicted as a dual lever system 200. Each vertical lever of the dual lever system denotes one or more planetary gear sets. For example, a first vertical lever 210 represents the power split planetary 110 and a second vertical lever 212 represents a combination of the output coupling planetary 130 and the output planetary 120. For the first vertical lever 210, torque corresponding to the engine 102 and the first electromotor 140, is balanced by torque corresponding to the PTO1 and the PTO2. For the second vertical lever 212, torque corresponding to the power split planetary 110 is balanced by torque corresponding to the mid clutch 170, the low clutch 172, and the second electromotor 150. As described above, with reference to FIG. 1, the engine 102 is coupled to/decoupled from the power split planetary 110 of FIG. 1 by the neutral clutch 144 and the PTO2 106 is coupled to/decoupled from the power split planetary by the PTO2 clutch 142. For example, the neutral clutch 144 is open in FIG. 2.

The mid clutch 170 may ground to the frame of the vehicle (not shown) at a first fixed component 222. The low clutch 172 may ground to the frame of the vehicle (not shown) at a second fixed component 224. In one example, the first and second fixed components 222, 224 may be the housing of the transmission 103 of FIG. 1. As such, the mid clutch 170 and the low clutch 172 may be engaged in a hill hold mode of the transmission to lock the second vertical lever 212 (e.g., output coupling planetary 130 and the output planetary 120 of FIG. 1) when immobilization of the vehicle is desired, such as when the vehicle is parked. By locking the second vertical lever 212 with the mid and low clutches 170, 172, the drive system 100 may be grounded and the output shaft 148 mechanically locked. Furthermore, neither the engine 102 nor the electromotors are used to lock the second vertical lever 212. Instead, either the engine 102 or the first electromotor 140 may be used to power the PTO2 106 and the second electromotor 150 may be operated in a speed control mode during vehicle launch with the transmission adjusted to a launch or drive mode.

In the speed control mode, an amount of torque provided by the second electromotor 150 to maintain the vehicle stationary, e.g., at a zero speed setting, may be estimated. When the service brakes of the vehicle are fully released, where the service brakes are initially engaged upon shifting of a vehicle gearbox into a drive gear (e.g., in a forward or reverse vehicle direction) the second electromotor 150 is adjusted to a torque control mode. As such, the amount of torque estimated during operation of the second electromotor 150 in the speed control mode may be added to an amount of torque requested based on engagement of a throttle pedal. In some instances, in order to simulate creep torque as the service brakes are released, a speed set point of the second electromotor 150, while in the speed control mode, may be ramped up according to a change in pressure at the service brakes.

By using the mid and low clutches of the transmission to lock the output shaft, rather than power sources of the drive system, locking of the output shaft may be achieved for long periods without overheating, and a torque output of the transmission may be delivered in a direction matching a requested direction of vehicle propulsion. In addition, locking the output shaft leaves the engine and PTO2 free to turn, allowing the transmission to provide auxiliary power, e.g., to pumps, during standstill, if desired.

An example of a method 300 for executing a hill hold strategy is shown in FIG. 3. An example of a method 400 for executing a hill launch strategy is shown in FIG. 4. The methods 300 and 400 may be implemented in a vehicle with a drive system with an electromechanical infinitely variable transmission, such as the drive system 100 of FIG. 1. The transmission may receive power input from one or more of an engine and a set of electromotors, including a first electromotor, and a second electromotor. Instructions for carrying out the methods 300 and 400 may be executed by a controller, such as the controller 160 of FIG. 1, based on instructions stored on a memory of the controller and in conjunction with signals received from sensors of the drive system, such as the sensors described above with reference to FIG. 1. The controller may employ actuators of the system to adjust drive system operation, according to the methods described below. For example, the controller may command operation of an electromotor of the drive system in a speed mode with an output speed set to 0 kilometers per hour (kph) based on release of a service brake, as monitored by a pedal position sensor. Further, the controller may include memory-holding instructions executable via a processor, as previously discussed.

At 302, the method includes determining one or more operating conditions. For example, a vehicle stopped condition, a status of the engine (e.g., on or off), a status of an electric machine of the vehicle, vehicle speed, torque demand, etc. may be determined. In other examples, an operating condition may include operation of one or more power take off devices. In one embodiment, the hill hold strategy described herein may be executed with an active PTO, e.g., PTO2 of FIGS. 1 and 2. In another embodiment, the PTO operation may be deactivated.

At 304, the method 300 includes determining whether the vehicle is in a hill hold situation. In some examples, a hill hold situation may include a vehicle stopped condition, e.g. application of a parking brake or a service brake, e.g., service brake 174 of FIG. 1. In some examples, the hill hold situation may be determined by the vehicle operator, e.g., by actuating a button. In other examples, the hill hold situation may be determined by the controller. The hill hold situation may be determined by a combination of vehicle operator input and controller signaling. In one example, the controller may receive a signal that the vehicle has entered a hill zone, e.g., via global positioning device (GPS). In an example, following the controller determination of entering a hill zone, the hill hold situation may include the vehicle halting to stop and an operator engaging the service brake for more than a threshold duration (e.g. 3 seconds [s]), thus indicating to the controller that the vehicle has entered the hill hold situation. If the vehicle is not in the hill hold situation, the method continues to 308 where the vehicle may continue to operate under current condition, e.g., the controller operates the transmission based on torque demand. If the vehicle is in the hill hold situation, the method continues to 306, where the controller may execute a hill hold operation.

At 306, the method 300 includes execution of a hill hold operation by the controller. In an example, a hill hold operation may include activating a hill hold clutch configuration. In an exemplary embodiment, during a vehicle stopped condition, the hill hold operation may include opening (e.g., disengaging) an input coupled clutch, such as the input coupled clutch 146 of FIG. 1, and closing (e.g., engaging) each of a mid clutch and a low clutch of the transmission, such as the mid clutch 170 and low clutch 172 of FIG. 1. By opening the input coupled clutch, the second electromotor may be decoupled from a mid-range planetary (e.g., the output planetary 120 of FIG. 1) of the transmission. By closing the mid clutch, a portion of the mid-range planetary may be locked to a stationary portion of the transmission, such as the transmission housing. For example, a ring gear of the mid-range planetary (e.g., the ring gear 124 of FIG. 1) may be held stationary.

By closing the low clutch, a carrier of a low-range planetary of the transmission (e.g., the carrier 138 of the output coupling planetary 130 of FIG. 1) may also be locked to the stationary portion of the transmission. Furthermore, grounding of the ring gear of the mid-range planetary may lock a plurality of planetary gears (e.g., the plurality of planetary gears 126 of FIG. 1) of the mid-range planetary as well as a carrier of a power split planetary (e.g., the carrier 118 of the power split planetary 110 of FIG. 1) coupled to the plurality of planetary gears of the mid-range planetary. As a result, an output shaft (e.g., the output shaft 148 of FIG. 1) of the transmission may be mechanically locked and maintained stationary without drawing torque from the first or second electromotors or the engine. As a result, the transmission may be maintained in the hill hold configuration for a prolonged period of time without causing overheating of the electromotors or the engine.

During active hill hold, the controller (e.g. controller 160) may control the second electromotor (e.g. the second electromotor 150 of FIGS. 1 and 2) of the transmission in a speed control mode. In an example, a proportion-integral controller may set (e.g., as a set point in a feedback speed controller) an output speed of the second electromotor to 0 kph with a tunable deadband. The set point may be maintained by the controller with speed feedback measured by a speed sensor (e.g., speed sensor 176). The controller may compare the set point to a measured speed received from the speed sensor to generate an error signal that is driven to zero by the controller to maintain zero speed by adjusting the torque of the second electromotor.

If hill hold is activated as described above (e.g., with the output shaft locked, thereby maintaining the vehicle wheels stationary), the second electromotor may not experience any load. A load may be imposed, however, when the transmission is adjusted out of the hill hold mode, e.g., to a drive mode, and the output shaft is no longer mechanically locked by engagement of at least one of the low clutch or the mid clutch. In one example, the inhibited movement of the wheels of the vehicle during operation of the hill hold mode may enable the operator to release the service brake while the transmission is in the hill hold mode. In instances where the hill hold mode is not engaged correctly or a gradient of the hill is too steep, the closed mid and low clutches may provide a mechanism for circumventing unintended movement, e.g., rollback, of the vehicle. The mechanism may therefore support a hill hold, e.g., holding the vehicle stationary regardless of slope, until the vehicle is shutdown with the parking brake engaged or vehicle launch is requested, for example. The torque generated by the second electromotor to maintain zero speed may be used to estimate a slope at which the stationary vehicle is stopped and estimate a hill launch torque for subsequent vehicle propulsion, described further below. By adjusting the second electromotor to the speed control mode, the torque that the second electromotor produces to hold the speed at zero may be stored in the controller's memory as a learned torque output. In some examples, the output magnitude may be positive torque, and in other examples, the output magnitude may be negative torque.

An example for operating a hill launch in a vehicle with an EMIVT drive system, e.g., vehicle system 100 of FIG. 1, is depicted in FIG. 4 by the method 400. In the hill launch operation, the second electromotor may be transitioned from speed control to torque control while maintaining torque during the transition from hill hold to driving. In an example, a service brake or other braking mechanism outside of the transmission may be disengaged prior to the hill launch operation and in other examples, the hill launch operation may occur with the service brake or other braking mechanism applied.

At 402, the method 400 includes determining one or more operating conditions. For example, a vehicle stopped condition, a status of the engine (e.g., on or off), a status of an electric machine of the vehicle, vehicle speed, torque demand, etc. may be determined. In an example, active operation of one or more PTO devices may be an operating condition.

At 404, the method includes determining whether releasing the hill hold clutch configuration is indicated. In one example, the service brake may be engaged/depressed by the operator when entering the hill hold configuration of the transmission, as described above with reference to the method 300 of FIG. 3. In such an example, an indication to release the hill hold clutch configuration may be signaled following the release of the service brake, e.g., by an operator request to the controller, in one example. As another example, the service brake may be disengaged/released by the operator during the hill hold configuration of the transmission, as described above with reference to the method 300 of FIG. 3. In one such example, the controller may command release of the hill hold clutch configuration based on the application of the service brake. If releasing of the hill hold clutch configuration is not indicated, the method continues to 406, where the clutch configuration may be maintained independent of a status of the service brake.

If the indication to release the clutch is received, the method continues either to 408, where the controller may execute a hill launch after the service brake is released, or to 410, where the controller may execute a hill launch with the service brake applied. The vehicle may remain stationary until a set of actions are completed, the set of actions including a first action, a second action, and a third action, which may be completed in any order. The first action includes releasing either a mid clutch or a low clutch of the transmission. The second action includes selecting a drive mode, e.g., drive or reverse. The third action includes releasing the service brake, if not already released.

Figure 5:
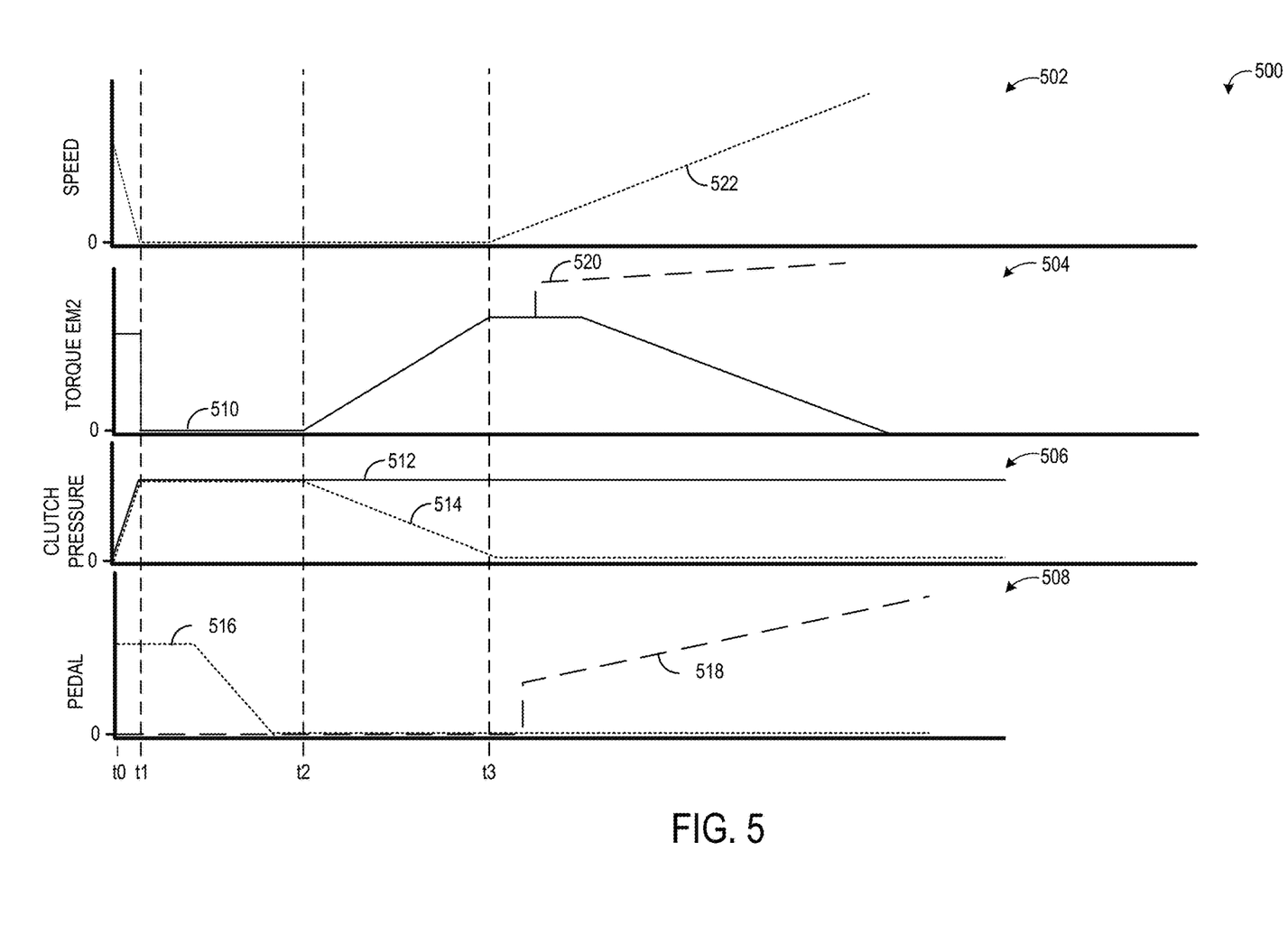
FIG. 5 shows a timing diagram for example prophetic operation to engage a drive system configuration in a hill condition according to the method of FIGS. 3-4.

At 408, the method 400 includes a launch after service brake is released. In one example, following the release of the service brake, and upon release of one of the output shaft locking clutches (e.g., the low clutch 172 of FIGS. 1-2), the controller may adjust an output magnitude of one of the set of electromotors, e.g., the second electromotor, in speed control mode to control the vehicle speed. The vehicle speed, in one example, may be adjusted to 0 kph. In this mode, the controller may learn a torque output of the second electromotor corresponding to zero vehicle speed upon fully releasing one of the mid clutch or the low clutch. During the release, the allowed deadband around the speed set point may be reduced or fully eliminated. By adjusting the second electromotor in speed control, the torque that the second electromotor produces to hold the speed at zero may be stored in the controller's memory as a learned torque output. In some examples, the output magnitude may be positive torque, and in other examples, the output magnitude may be negative torque. The torque generated at the second electromotor may be attributed to a combination of operation of the second electromotor and the transfer of torque from the released clutch (low and/or mid clutch) to the second electromotor. In further examples, the learned torque output of the second electromotor may be used to estimate road grade, e.g., hill slope, without the use of sensors, e.g., an accelerometer, for sensing road grade. An example of this procedure is shown in FIG. 5.

Returning to 410, the method 400 includes a launch from hill hold with service brake applied. As such, the hill hold torque output may be learned before the service brakes are released and an amount of torque generated by the second electromotor to provide the learned hill hold torque output may be ramped up according to release of the service brakes. In one example, the release of one of the output shaft locking clutches (e.g. mid clutch 170 or the low clutch 172 of FIGS. 1-2) may be initiated with an engagement of a service brake. The first action, e.g., release of the mechanically locked clutch configuration, and the second action, e.g., selecting the drive mode, may be executed with the service brake applied. With the service brake applied, release of one of the clutches (e.g., the mid clutch 172 or the low clutch 170) may transiently transfer the torque from the released clutch to the service brake. In an example, with the release of the service brake (e.g., signaled to the controller by a service brake sensor), the controller may adjust an output magnitude of the second electromotor responsive to speed control to control the vehicle speed to zero. As described above with respect to method 400 step 408, in speed control, the controller may learn the torque output of the second electromotor corresponding to zero vehicle speed. The torque that the second electromotor produces to hold the speed at zero may be stored in the controller's memory as a learned torque output. An example of this procedure is shown in FIG. 6.

From 408 and from 410, the method 400 continues to 412 where a launch torque may be added to the torque from a throttle demand. The second electromotor may be adjusted to a torque control mode following the set of actions described above, including the release of the service brake, the release of one of the output shaft locking clutches (e.g., mid or low clutch), and the selection of the drive mode (e.g., forward or reverse). When adjusted to the torque control mode, the second electromotor may be operated to provide an amount of torque matching a sum of the amount of torque determined during operation in the speed control mode to maintain the zero speed set point and also provide an additional amount of torque corresponding to engagement of the throttle pedal. In some examples, the torque demand based on throttle may include an operator input, e.g., on the throttle pedal according to an amount of desired torque. As the vehicle launches from the hill, the first source of torque (e.g. the added learned torque) will be gradually reduced to zero, with only the throttle demanding torque applied to the second electromotor thereafter. The ramp down of the hill hold output torque may be executed according to a shift algorithm and may be optionally calibrated. The method ends.

In some examples, the drive system may be configured to simulate creep torque during vehicle launch. For example, the speed set point of the second electromotor 150, while in the speed control mode, may be increased in response to a change in position or pressure at the service brakes as the service brakes are released. As a result, the vehicle may creep forward or backward (depending on the selected drive gear) during release of the service brakes where a rate of vehicle creep may be proportional to an extent that the service brakes are released.

Figure 6:
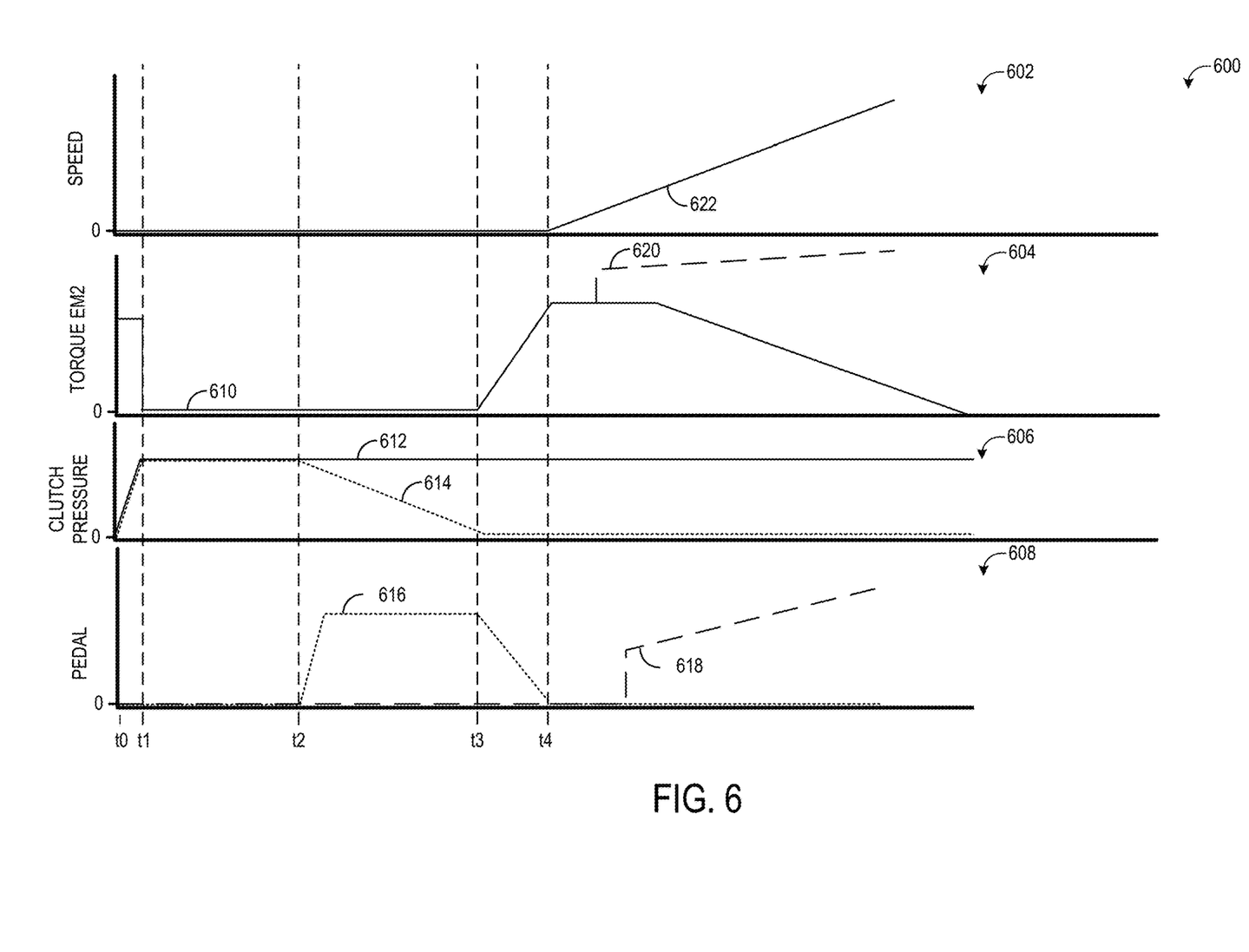
FIG. 6 shows a timing diagram for example prophetic operation to disengage a drive system configuration in a hill condition according to the method of FIGS. 3-4.

FIGS. 5 and 6 represent timing diagrams 500 and 600 for the example prophetic operation of a hill hold strategy for a vehicle with an EMIVT, according to the method 300 of FIG. 3 and the method 400 of FIG. 4. For example, the vehicle may activate a hill hold and/or a hill launch utilizing an output shaft locking clutch combination that indicates an operational mode to be applied to an electromotor (e.g., the second electromotor of FIGS. 1 and 2, hereafter, EM2). The timing diagram 500 depicts an exemplary embodiment of the methods 300, 400 where, during a first vehicle stopped condition, clutch release and adjustment of the EM2 to speed control occurs following the operator release of the service brake. The timing diagram 600 depicts an exemplary embodiment of the methods 300, 400 where an operator may apply the service brake concurrent with the release of the clutch. The horizontal (x-axis) denotes time and the vertical markers t0-t4 identify relevant times in the methods of FIGS. 3 and 4 from a hill hold to a hill launch.

Turning to FIG. 5, the timing diagram 500 depicts a hill launch with the service brake released. Plot 502 shows vehicle output speed 522, e.g., as measured by a speedometer. Plot 504 shows EM2 torque 510 and EM2 throttle demand torque 520, e.g., as measured by a torque transducer. Plot 506 shows a mid clutch pressure 512 and low clutch pressure 514. Plot 508 represents a service pedal pressure 516 and a throttle pedal pressure 518.

Before t1, e.g., between t0 and t1, activation of a hill hold clutch configuration is indicated (e.g., a hill hold operation of FIG. 3). In one example, prior to t1, the activation of the hill hold clutch configuration may be indicated to the controller by an action of the operator and/or from one of the sensors of the vehicle system. In one example, the controller may receive a signal that the vehicle has entered a hill zone, e.g., via global positioning device (GPS). In an example, following the controller determination of entering a hill zone, a pressure exerted on the service pedal 516 greater than a threshold pressure, e.g., 900 pounds per square inch (psi), by the operator for a threshold duration, e.g., for 3 s, may signal to the controller to execute a hill hold operation.

At t1, the vehicle is in the hill hold. In plot 506, the clutch pressure sensor detects mid clutch pressure 512 and the low clutch pressure 514 in excess of a threshold pressure, e.g., 400 psi, indicating the vehicle is in the hill hold clutch configuration. In an example, the low clutch 514 and the mid clutch 512 are activated with application of pressurized hydraulic fluid. In an example, with hill hold activated, in plot 502, the vehicle speed is at 0 kph and in plot 504, the EM2 torque 510 is 0 Newton meters (Nm). With the hill hold activated, optionally, the operator may release the service pedal/brake. Thus, in plot 508, the service pedal 516 and throttle pedal 518 are fully released during t1 to t2. The vehicle may remain in the hill hold clutch configuration for the duration of t1 to t2 and without any additional load on the electromotors or the internal combustion engine.

At t2, hill hold deactivation begins. Following the method 400 of FIG. 4, the vehicle may remain stationary until the clutch is to be released and the set of actions, as described above, are executed, independent of order of execution, e.g., pressure released from one of the either the mid clutch or low clutch, a drive mode selected (e.g., forward or reverse), and service pedal pressure released. In one example, at t2, the clutch pressure sensor signals to the controller that pressure from the low clutch 514 falls below a threshold pressure, e.g., 400 psi. In an alternate example, the mid clutch 612 may be released and the low clutch may remain engaged.

In the timing diagram 500, the service brake 516 is released prior to t2. Thus at t2, the EM2 torque 510 builds concurrent with the release of the low clutch 514 due to the zero speed motor set point and feedback of the motor speed control. The controller adjusts EM2 in speed control to hold at 0 kph the vehicle speed 522 in plot 502. The controller effectively learns an amount of torque corresponding to maintaining the vehicle speed 522 at 0 kph, e.g., 125 Nm. In one example, the vehicle may remain immobilized until the selection of a drive mode is made by the operator. In another example, the vehicle may remain immobilized until the clutch pressure is fully released. While the illustration in FIG. 5 shows the speed held at exactly zero, those skilled in the art of control systems will recognize that there is some error in speed that is detected by motor movement to drive a feedback controller in the speed control operation to generate the increased motor torque to maintain zero speed.

At t3, execution of the three actions (clutch release, service pedal/brake release, and drive mode selection) is complete. As an example, the clutch pressure sensor and the service pedal pressure sensor detect the clutch pressure and the service pedal pressure at the release pressure thresholds, e.g., at 0 psi. Upon completion of the three actions, the controller may adjust the EM2 to torque control. In some examples, the torque applied to the EM2 may be a superposition of the learned torque from previous speed control (e.g., at the end of t2) with the torque from the throttle pedal 518 demand. In 504, torque according to engagement of the throttle pedal 520, e.g., 75 Nm, may be added to the EM2 torque 510 from the previous speed control, e.g., 125 Nm. Thus, the vehicle may be launched in the forward direction at 200 Nm. At t3, in plot 502, vehicle speed 522 increases with the application of the calculated torque to the EM2.

Continuing with FIG. 6 the timing diagram 600 depicts a hill launch with the service brake applied. Plot 602 shows vehicle output speed 622, e.g., as measured by a speedometer. Plot 604 shows EM2 torque 610 and EM2 throttle demand torque 620, e.g., as measured by a torque transducer. Plot 606 shows a mid clutch pressure 612 and low clutch pressure 614. Plot 608 represents a service pedal pressure 616 and a throttle pedal pressure 618.

The timing diagram 600 begins similar to the timing diagram 500, following the methods 300 and 400 described in FIG. 3 and FIG. 4. Before t1, e.g., between t0 and t1, activation of a hill hold is indicated (e.g., the hill hold operation of FIG. 3). Examples of inputs determining the activation of a hill hold may include a signal from the controller, a manual request by the vehicle operator, or a combination of controller and operator inputs, as described above with respect to the timing diagram 500. As one example, the controller may receive an indication that vehicle has entered a hill zone, e.g., a vehicle setting selected by an operator. An as example, prior to t1, following the indication of entering a hill zone, the activation of the hill hold clutch configuration may be signaled to the controller by an action of the operator, e.g., by a actuation of a button.

At t1, the vehicle is in the hill hold clutch configuration. As shown in plot 606, a mid clutch 612 and a low clutch 614 are engaged, for example, via detection of clutch pressure in excess of a threshold pressure, e.g., 400 psi. In an example, with hill hold activated, the vehicle output speed 622 of plot 602 is at 0 kph, and in plot 604, EM2 torque 610 is 0 Nm. With the output shaft locked by the hill hold clutch configuration, the service brake 616 may not contribute the hill hold, enabling the operator to take their foot off the service brake. Thus, at t1, the service pedal 616 and throttle pedal 618 are shown disengaged. The vehicle may remain in the hill hold clutch configuration for the duration of t1 to t2 and without any additional load on the electromotors or the internal combustion engine.

At t2, a request to deactivate the hill hold is indicated. In one example, a service brake pressure sensor signals to the controller the application of the service brake 616 in excess of a pressure threshold, e.g., greater than 800 psi. In one example, concurrent with the application of the service brake pressure, the low clutch 614 may begin to be released.

During the release of the low clutch 614, the allowed deadband around the EM2 speed set point may be reduced or eliminated. According to the method 400 of FIG. 4, the output speed control of the vehicle may continue, e.g., at 0 kph, until three action are finished, independent of order of execution: pressure released from one of either the mid clutch or the low clutch; a drive mode selected (e.g., forward or reverse); and, service brake pressure released.

Continuing in t2, the plot 608 shows an engaged service brake 616. With the service brake engaged, torque is transferred from the released low clutch 614 to the service brake 616. Thus, at t2, the EM2 torque continues to be 0 Nm and the vehicle may remain immobilized with the vehicle output speed 622 held at 0 kph.

At t3, the low clutch 614 is fully released. In one example, a clutch pressure sensor detects the low clutch 614 pressure at a threshold pressure, e.g., 0 psi, indicating full release. With the EM2 in speed control, the EM2 torque 610 builds concurrent with the release of the service pedal 616, due to the zero speed motor set point and feedback of the motor speed control. The controller adjusts EM2 in speed control such to hold at 0 kph the vehicle speed 622. The controller learns an amount of torque corresponding to maintaining the vehicle speed 622 at 0 kph, e.g., 100 Nm. In one example, the EM2 torque 610 learned at the end of t4 may be the first of the two sources of torque in the hill launch calculation.

At t4, the service pedal 616 is fully released. In one example, a pedal pressure sensor detects the service pedal pressure at a threshold pressure, e.g., 0 psi, indicating full release. Also at t4, the three actions (clutch release, service brake release, and drive mode selection) are completed. Upon completing the three actions, the controller may adjust the EM2 speed control to torque control. In one example, torque applied to the EM2 may be the product of the torque learned from previous speed control, e.g., at the end of t4, and a torque from the throttle pedal 618. In plot 602, at t4, vehicle output speed 622 increases with the application of the calculated torque to the EM2. In plot 604, line 620 depicts the addition of the throttle pedal 618 torque, e.g., 50 Nm, to the torque 610 of speed control, e.g., 100 Nm, thus launching the vehicle from the hill in the forward direction with 150 Nm of torque.

Following the application of calculated torque to the EM2, the learned torque from the previous speed control may be gradually reduced to zero and the throttle torque remains as the vehicle torque demand input. In an example where no torque is demanded by the throttle, the launch torque will be the torque learned during the previous speed control without the additional throttle torque. After launch, the vehicle may come to a stop as the speed control torque is tapered to 0 Nm. In a further example, a driver may select a reverse drive mode on a slope, e.g., the driver initiates a reverse down a hill. In an example, the launch torque calculation is the superposition of the speed mode torque (e.g., 50 Nm) and the throttle torque (e.g., −25 Nm). The torque may be applied in the appropriate sign to ensure a smooth launch in any drive mode.

In this way, a hill hold operation adapted with a launch strategy that may be modified according to launch conditions is obtained for a vehicle with an electromechanical infinitely variable transmission. By closing the mid and low clutches of the transmission, a vehicle may remain in a mechanically locked clutch configuration without imposing loads on the electromotors or the internal combustion engine. The locked clutch configuration may thus enable hill holds for long periods without localized overheating. A clean launch from hill hold, e.g., without rollback, is achieved by providing an output torque in an intended direction indicated by driver input, e.g., throttle demand, and the learning a torque output, e.g., an electromotor torque to maintain speed control at zero. Hill hold operation may be achieved without a slope sensor or other slope estimate data. The technical effect of the hill hold operation, as described herein, is a more natural driving experience for the operator and reduced wear on the electromotors and internal combustion engine of the vehicle. Additionally, the hill hold operation may allow for the operation of power take-off devices during standstill, e.g., pumps. As a further advantage, the hill hold operation may inhibit unintended movement of the vehicle, e.g., in the event of a too steep gradient.

The disclosure also provides support for a method for a vehicle, comprising: during a vehicle stopped condition, operating with a clutch of a transmission engaged to mechanically lock the transmission, the transmission having a plurality of power inputs including receiving input from an electric machine and a prime mover, releasing at least one of the clutch or a service brake, and while releasing, concurrently adjusting an output magnitude of the electric machine responsive to speed control to control to zero vehicle speed. In a first example of the method, the method further comprises: learning a torque output of the electric machine required to maintain zero vehicle speed upon fully releasing the clutch or the service brake. In a second example of the method, optionally including the first example, the method further comprises: estimating a road grade based on the learned torque output. In a third example of the method, optionally including one or both of the first and second examples, the method further comprises: adding the learned torque output to an operator torque request, and adjusting the prime mover and the transmission in response thereto, and wherein the method does not include sensing road grade from an accelerometer onboard the vehicle. In a fourth example of the method, optionally including one or more or each of the first through third examples, the prime mover is an internal combustion engine. In a fifth example of the method, optionally including one or more or each of the first through fourth examples, the transmission includes at least two power inputs from the electric machine and another electric machine. In a sixth example of the method, optionally including one or more or each of the first through fifth examples, after an increase in the operator request, the added learned torque is gradually reduce to zero after the vehicle is moving from the vehicle stopped condition. In a seventh example of the method, optionally including one or more or each of the first through sixth examples, the vehicle is an off-highway work machine.

The disclosure also provides support for a method for a vehicle, comprising: during a first vehicle stopped condition, operating with a clutch of a transmission engaged to mechanically lock the transmission, the transmission having a plurality of power inputs including receiving input from an electric machine and a prime mover, before an operator torque request and after an operator releases a service brake, releasing the clutch and concurrently adjusting an output magnitude of the electric machine responsive to a speed control to control to a zero vehicle speed, and during a second vehicle stopped condition, operating with the clutch engaged to mechanically lock the transmission, and responsive to operator application of the service brake, releasing the clutch, and after releasing the clutch and while the service brake is released, concurrently adjusting an output magnitude of the electric machine responsive to the speed control to control to the zero vehicle speed. In a first example of the method, the method further comprises: learning a torque output of the electric machine required to maintain zero vehicle speed during each of the first and second vehicle stopped conditions. In a second example of the method, optionally including the first example, the method further comprises: estimating a road grade based on the learned torque outputs. In a third example of the method, optionally including one or both of the first and second examples, the method further comprises: adding the learned torque outputs to an operator torque request, and adjusting the prime mover and the transmission in response thereto. In a fourth example of the method, optionally including one or more or each of the first through third examples, the prime mover is an internal combustion engine. In a fifth example of the method, optionally including one or more or each of the first through fourth examples, the transmission includes at least two power inputs from the electric machine and another electric machine. In a sixth example of the method, optionally including one or more or each of the first through fifth examples, the vehicle is an off-highway work machine.

The disclosure also provides support for a system for a vehicle, comprising: a transmission having a clutch and having a plurality of power inputs, a service brake, a prime mover coupled to a first power input of the transmission, an electric machine coupled to a second power input of the transmission, and a controller having instruction for execution, the instructions for: during a vehicle stopped condition, operating with the clutch engaged to mechanically lock the transmission, and release the clutch, and while releasing, concurrently adjusting an output magnitude of the electric machine responsive to a speed control to control to a zero vehicle speed. In a first example of the system, the controller further has instructions to, responsive to release of the service brake, concurrently adjusting the output magnitude of the electric machine responsive to the speed control to control to the zero vehicle speed. In a second example of the system, optionally including the first example, the prime mover is an internal combustion engine. In a third example of the system, optionally including one or both of the first and second examples, the vehicle does not include an accelerometer to determine road grade. In a fourth example of the system, optionally including one or more or each of the first through third examples, the controller carries out the instructions independent of road grade.

Note that the example control and estimation routines included herein can be used with various vehicle system configurations. The control methods and routines disclosed herein may be stored as executable instructions in non-transitory memory and may be carried out by the control system including the controller in combination with the various sensors, actuators, and other system hardware. The specific routines described herein may represent one or more of any number of processing strategies. As such, various commands, operations, and/or actions described herein may be performed in the sequence illustrated, in tandem, or in some cases omitted. Likewise, the order of processing is provided for ease of description and is not necessarily required to achieve the features and advantages of the examples described herein. One or more of the actions, operations, and/or functions, described herein may be repeatedly performed depending on the particular strategy being used. Further, the described actions, operations, and/or functions may graphically represent code to be programmed into non-transitory memory of the computer readable storage medium in a differential control system, where the described actions are carried out by executing the instructions in a system including the various hardware components in combination with the electronic controller.

It will be appreciated that the configurations and routines disclosed herein are exemplary in nature, and that these specific examples are not to be considered in a limiting sense, because numerous variations are possible. For example, the above technology may be applied to motor systems with different configurations and in a vehicle with a variety of propulsion sources such as motors, engines, combinations thereof, etc. Moreover, the terms "first," "second," "third," and the like are not intended to denote any order, position, quantity, or importance, but rather are used merely as labels to distinguish one element from another, unless explicitly stated to the contrary. The subject matter of the present disclosure includes all novel and non-obvious combinations and sub-combinations of the various systems and configurations, and other functions, features, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither excluding nor requiring two or more such elements. Other combinations and sub-combinations of the disclosed features, functions, elements, and/or properties may be claimed through amendment of the present claims or through presentation of new claims in this or a related application. Such claims, whether narrower, broader, equal, or different in scope to the original claims, also are regarded as included within the subject matter of the present disclosure.

The invention claimed is:

1. A method for a vehicle, comprising:
during a vehicle stopped condition, actively engaging a first clutch and a second clutch, wherein actively engaging the first clutch and the second clutch mechanically locks a transmission of the vehicle and inhibits movement of wheels of the vehicle, the transmission having a plurality of power inputs including receiving input from a first electric machine and a prime mover;
releasing at least one of the first clutch and the second clutch; and
in response to or concurrent to the at least one of the first clutch and the second clutch being released, adjusting an output magnitude of the first electric machine in a speed control mode to control to a zero vehicle speed;
wherein the first clutch and the second clutch are included in the transmission,
wherein the first clutch is a mid clutch coupled to an output planetary, and
wherein the second clutch is a low clutch coupled to an output coupling planetary;
in response to brake pedal release, operating the first electric machine in a torque control mode, and balancing torque corresponding to a power split planetary by torque corresponding to the mid clutch, the low clutch, and a second electric machine of the transmission, and wherein the second electric machine of the transmission is coupled to the output planetary.

2. The method of claim 1, wherein operating the first electric machine in the torque control mode includes operating the first electric machine based on a learned torque that maintains vehicle speed at zero.

3. The method of claim 2, wherein the method does not include sensing road grade from an accelerometer onboard the vehicle.

4. The method of claim 1, wherein the prime mover is an internal combustion engine.

5. The method of claim 1, wherein the transmission is an electromechanical infinitely variable transmission (EMIVT) that includes multiple planetary gear sets that are rotationally coupled to the first electric machine and the second electric machine.

6. The method of claim 3, wherein, after an increase in an operator request, an added learned torque is gradually reduced to zero after the vehicle is moving from the vehicle stopped condition.

7. The method of claim 1, wherein the vehicle is an off-highway work machine.

8. A method for a vehicle, comprising:
during a first vehicle stopped condition, actively engaging a low clutch and a mid clutch of a transmission, wherein actively engaging the low clutch and the mid clutch mechanically locks the transmission and inhibits movement of wheels of the vehicle, the transmission having a plurality of power inputs including receiving input from a first electric machine and a prime mover;
before an operator torque request and after an operator releases a service brake, releasing the low clutch and concurrently adjusting an output magnitude of the first electric machine in a speed control mode to control to a zero vehicle speed;
during a second vehicle stopped condition, operating with the low clutch and the mid clutch engaged to mechanically lock the transmission; and
responsive to operator application of the service brake, releasing the low clutch, and, after releasing the low clutch and while the service brake is released, concurrently adjusting an output magnitude of the first electric machine in a speed control mode to control to the zero vehicle speed,
wherein the transmission is an electromechanical infinitely variable transmission (EMIVT) that includes:
a power split planetary gear set that is rotationally coupled to a second electric machine,
wherein the low clutch is grounded to a frame of the vehicle at a first fixed component, and
wherein the mid clutch is grounded to the frame of the vehicle at a second fixed component.

9. The method of claim 8, further comprising in response to brake pedal release or the low clutch release, operating the first electric machine in a torque control mode.

10. The method of claim 9, wherein operating the first electric machine in the torque control mode includes operating the first electric machine based on a learned torque that maintains vehicle speed at zero.

11. The method of claim 10, wherein the method does not include sensing road grade from an accelerometer onboard the vehicle.

12. The method of claim 8, wherein the prime mover is an internal combustion engine.

13. The method of claim 8, wherein the EMIVT includes multiple planetary gear sets that are rotationally coupled to the first electric machine and the second electric machine.

14. A system for a vehicle, comprising:
a transmission including:
a low clutch;
a mid clutch; and
a plurality of power inputs;
a service brake;
an internal combustion engine coupled to a first power input of the transmission;
a first electric machine coupled to a second power input of the transmission; and
a controller having instructions for execution, the instructions for:
during a vehicle stopped condition, actively engaging both the low clutch and the mid clutch, wherein actively engaging both the low clutch and the mid clutch mechanically locks the transmission and inhibits movement of wheels of the vehicle;
release the low clutch; and
while releasing or in response to releasing the low clutch, adjusting an output magnitude of the first electric machine in a speed control mode to control to a zero vehicle speed,
wherein the controller further has instructions to, in response to brake pedal release or the low clutch release, operating the first electric machine in a torque control mode, wherein the low clutch is coupled to an output coupling planetary, and wherein the mid clutch is coupled to an output planetary,
wherein the transmission is an electromechanical infinitely variable transmission (EMIVT) that includes:
a power split planetary gear set that is rotationally coupled to a second electric machine,
wherein the low clutch is grounded to a frame of the vehicle at a first fixed component, and
wherein the mid clutch is grounded to the frame of the vehicle at a second fixed component.

15. The system of claim 14, wherein the vehicle does not include an accelerometer to determine road grade.

16. The system of claim 14, wherein the controller carries out the instructions independent of road grade.

17. A system for a vehicle, comprising:
a transmission including:
a low clutch;
a mid clutch; and
a plurality of power inputs;
a service brake;
an internal combustion engine coupled to a first power input of the transmission;
a first electric machine coupled to a second power input of the transmission; and
a controller having instructions for execution, the instructions for:
during a vehicle stopped condition, actively engaging both the low clutch and the mid clutch, wherein actively engaging both the low clutch and the mid clutch mechanically locks the transmission and inhibits movement of wheels of the vehicle;
release the low clutch; and
while releasing or in response to releasing the low clutch, adjusting an output magnitude of the first electric machine in a speed control mode to control to a zero vehicle speed,
wherein the controller further has instructions to, in response to brake pedal release or the low clutch release, operating the first electric machine in a torque control mode, wherein the low clutch is coupled to an output coupling planetary, and wherein the mid clutch is coupled to an output planetary, and
wherein torque corresponding to a power split planetary is balanced by torque corresponding to the mid clutch, the low clutch, and a second electric machine of the transmission, and wherein the second electric machine of the transmission is coupled to the output planetary.

* * * * *